US009356492B2

(12) United States Patent
Chamberlin et al.

(10) Patent No.: US 9,356,492 B2
(45) Date of Patent: May 31, 2016

(54) ELECTRIC MACHINE WITH LIQUID COOLED HOUSING

(71) Applicant: Remy Technologies, LLC, Pendleton, IN (US)

(72) Inventors: Bradley D. Chamberlin, Pendleton, IN (US); Steve Burton, Anderson, IN (US)

(73) Assignee: Remy Technologies, LLC, Pendleton, IN (US)

( * ) Notice: Subject to any disclaimer, the term of this patent is extended or adjusted under 35 U.S.C. 154(b) by 206 days.

(21) Appl. No.: 13/905,787

(22) Filed: May 30, 2013

(65) Prior Publication Data

US 2014/0354089 A1    Dec. 4, 2014

(51) Int. Cl.
*H02K 9/19* (2006.01)
*H02K 5/20* (2006.01)

(52) U.S. Cl.
CPC ... *H02K 9/19* (2013.01); *H02K 5/20* (2013.01)

(58) Field of Classification Search
CPC ................................... H02K 9/19; H02K 5/20
USPC ........................................................... 310/54
See application file for complete search history.

(56) References Cited

U.S. PATENT DOCUMENTS

| 4,516,044 | A | * | 5/1985 | Bone ............................. 310/64 |
| 4,739,204 | A | | 4/1988 | Kitamura et al. |
| 4,870,307 | A | | 9/1989 | Kitamura et al. |
| 4,980,588 | A | | 12/1990 | Ogawa |
| 5,019,737 | A | | 5/1991 | Bruno |
| 5,448,118 | A | | 9/1995 | Nakamura et al. |
| 5,584,675 | A | | 12/1996 | Steurer et al. |
| 5,678,646 | A | | 10/1997 | Fliege |
| 6,198,183 | B1 | | 3/2001 | Baeumel et al. |
| 6,300,693 | B1 | | 10/2001 | Poag et al. |
| 6,317,963 | B1 | | 11/2001 | Powers et al. |
| 6,404,628 | B1 | | 6/2002 | Nagashima et al. |
| 6,727,611 | B2 | | 4/2004 | Bostwick |
| 7,009,318 | B2 | | 3/2006 | Iritani et al. |

(Continued)

FOREIGN PATENT DOCUMENTS

| EP | 0 288 429 B1 | 12/1992 |
| JP | 07-264802 A | 10/1995 |

(Continued)

OTHER PUBLICATIONS

International Search Report and Written Opinion; PCT/US2014/039978; Sep. 22, 2014; 11 pages.

*Primary Examiner* — Terrance Kenerly
(74) *Attorney, Agent, or Firm* — Bose McKinney & Evans LLP (57) ABSTRACT

An electric machine having a stator, a rotor and a housing assembly with two end caps and inner and outer axially extending members. The outer housing member is disposed about the inner member. Ribs extend from one housing member and engage the other housing member in an interstitial space. The other housing member may be a tubular sleeve. The ribs define axially extending fluid path segments within the interstitial space and the end caps close the opposite axial ends of the interstitial space and define an inlet and an outlet for a liquid coolant. The liquid coolant path may be serpentine. The housing member with ribs may include a sleeve portion with at least some ribs having a width greater than the radial thickness of the sleeve portion. Threaded fasteners can attach the end caps to the enlarged width ribs. The inner and outer housings are advantageously extrudable.

22 Claims, 9 Drawing Sheets

(56) References Cited

U.S. PATENT DOCUMENTS

| | | |
|---|---|---|
| 7,375,287 B2 | 5/2008 | Rathmann |
| 7,525,224 B2 | 4/2009 | Takenaka et al. |
| 7,705,496 B2 | 4/2010 | Zisler et al. |
| 7,737,585 B2 | 6/2010 | Bahr et al. |
| 7,977,829 B2 | 7/2011 | Platen et al. |
| 8,148,859 B2 | 4/2012 | Yoshida et al. |
| 8,161,643 B2 | 4/2012 | Smith et al. |
| 2005/0082921 A1 | 4/2005 | Schurter et al. |
| 2008/0017438 A1* | 1/2008 | Kanda et al. ............ 180/443 |
| 2008/0185924 A1* | 8/2008 | Masoudipour ........... H02K 5/20 310/54 |
| 2010/0007227 A1* | 1/2010 | Smith et al. .............. 310/64 |
| 2010/0013330 A1* | 1/2010 | Rodriguez Rodriguez et al. .......................... 310/54 |
| 2010/0033039 A1 | 2/2010 | Sakai et al. |
| 2011/0234029 A1* | 9/2011 | Pal ............................ 310/54 |
| 2012/0286596 A1 | 11/2012 | Creviston et al. |
| 2013/0328423 A1 | 12/2013 | Ikeda et al. |

FOREIGN PATENT DOCUMENTS

| | | |
|---|---|---|
| JP | 2013-009597 A | 1/2013 |
| WO | WO 2005-078900 A1 | 8/2005 |
| WO | WO 2014-194060 A1 | 12/2014 |

* cited by examiner

ELECTRIC MACHINE WITH LIQUID COOLED HOUSING

BACKGROUND

The present invention relates to electric machines and, more particularly, to electric machines having a housing which is used to cool the electric machine.

Electric machines include a stator and a rotor which rotates relative to the stator. Electric machines may operate as a motor, a generator or a motor/generator capable of selectively operating as either a motor or a generator. When operating as a motor, electrical current is input into the electric machine to generate a mechanical torque. When operating as a generator, mechanical torque is input into the electric machine to generate electrical current.

In some applications, electric machines require the use of a cooling system to remove heat from the electric machine during operation. The stator windings are often responsible for generating the majority of the heat during operation of the electric machine. As a result, it is generally desirable to cool the stator either by directly removing heat from the stator windings or by removing heat from the stator core. One common method of removing heat from the stator core is to mount the stator in a housing commonly referred to as a "water jacket" wherein the housing and the stator core are directly engaged and the housing includes a plurality of liquid coolant passages. A coolant, such as water, is circulated through the housing passages to remove heat from the housing. The housing thereby removes heat from the stator core and, consequently, the stator windings.

Improvements in the housing structure of such electric machines and the cost efficient manufacture of such housing structures remains desirable.

SUMMARY OF THE INVENTION

The present invention provides an electric machine with a housing assembly for circulating a coolant that can be manufactured and assembled in a cost-effective manner.

The invention comprises, in one form thereof, an electric machine that includes a stator operably coupled with a rotor wherein the stator includes a stator core and a plurality of windings and the rotor is rotatable about a rotational axis. The electric machine also includes a housing assembly having first and second end caps and inner and outer axially extending housing members. The stator core is disposed within and thermally coupled with the inner axially extending housing member. The outer axially extending housing member is disposed about the inner axially extending housing member and defines an interstitial space radially therebetween. A plurality of ribs extends radially from one of the inner and outer housing members into the interstitial space with each of the ribs having a distal end which engages the opposite one of the inner and outer housing members. The opposite one of the inner and outer housing members is a tubular sleeve with a substantially smooth walled surface facing the interstitial space. The plurality of ribs define a plurality of axially extending fluid path segments within the interstitial space. The first and second end caps sealingly close the opposite axial ends of the interstitial space and the housing assembly defines an inlet and an outlet wherein a liquid coolant enters the inlet, flows along a fluid path including the plurality of axially extending fluid path segments and is discharged through the outlet.

In some embodiments, the plurality of ribs extends radially outwardly from the inner housing member and the substantially smooth walled surface is a radially inward facing cylindrical surface.

In other embodiments, the inner and outer housing members and first and second end caps define a serpentine path for the liquid coolant wherein the liquid coolant flows in opposite axial directions in circumferentially adjacent ones of the fluid path segments with the axial direction of the fluid flow being reversed between the adjacent segments at positions proximate the first and second end caps.

In still other embodiments, the inner or outer housing member having the plurality of ribs extending therefrom includes a tubular portion having a radial thickness wherein at least some of the plurality of ribs define a circumferentially extending width greater than the radial thickness of the tubular portion. In such an embodiment, the first and second end caps may be secured with threaded fasteners extending into bores located in the ribs having circumferential widths greater than the radial thickness of the tubular portion.

Advantageously, the inner and outer housing members each have an axial length and define a cross section that is substantially uniform along the entire axial length of the respective housing member whereby the inner and outer housing members are each extrudable.

The invention comprises, in another form thereof, an electric machine that includes a stator operably coupled with a rotor wherein the stator includes a stator core and a plurality of windings and the rotor is rotatable about a rotational axis. The electric machine also includes a housing assembly having first and second end caps and inner and outer axially extending housing members. The stator core is disposed within and thermally coupled with the inner axially extending housing member and the outer axially extending housing member is disposed about the inner axially extending housing member and defines an interstitial space radially therebetween. A plurality of ribs extends radially from one of the inner and outer housing members into the interstitial space with each of the ribs having a distal end which engages the opposite one of the inner and outer housing members. The plurality of ribs defines a plurality of axially extending fluid path segments within the interstitial space. The inner and outer housing members each define an axial length and a cross section that is substantially uniform along the entire axial length of the respective housing member whereby the inner and outer housing members are each extrudable. The one housing member having a plurality of ribs extending therefrom includes a tubular portion having a radial thickness wherein at least some of the plurality of ribs define a circumferentially extending width greater than the radial thickness of the tubular portion. A plurality of fasteners engage the first and second end caps and extend into bores located in the ribs having circumferential widths greater than the radial thickness of the tubular portion to thereby secure the first and second end caps to the one housing member. The first and second end caps sealingly close the opposite axial ends of the interstitial space and define an inlet and an outlet wherein a liquid coolant enters the inlet, flows along a serpentine fluid path defined by the inner and outer housing members and the first and second end caps with the liquid coolant and is discharged through the outlet.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE INVENTION

An electric machine 20 is depicted in FIGS. 1-4 and includes a rotor assembly 22 and a stator assembly 24. In the illustrated embodiment, electric machine 20 is an internal permanent magnet motor/generator. The housing assembly disclosed herein can, however, be employed with other types of electrical machines.

The illustrated rotor assembly 22 is rotatable about an axis 30 and has a conventional structure with a rotor core 26 formed out of stacked electrical steel laminations. Rotor core 26 also defines axially extending slots in which permanent magnets 28 are disposed. Rotor core 26 is mounted on rotor shaft 32 which is rotatably supported by bearing assemblies 34, 36. A pulley 38 is mounted on one end of shaft 32. Pulley 38 can be engaged with a belt for the transfer of torque, for example, to power the turbine of a supercharger in a vehicle. Although the illustrated electric machine 20 is shown with a pulley 38, alternative embodiments may be used for other applications and be employed as a motor, generator or motor/generator.

Figure 1:
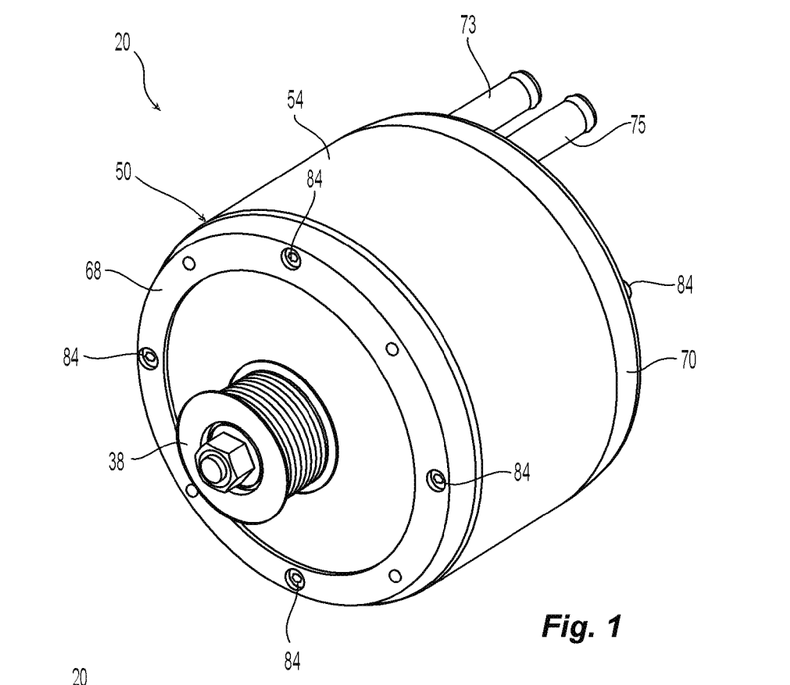
FIG. 1 is a perspective view of an electric machine.
Figure 2:
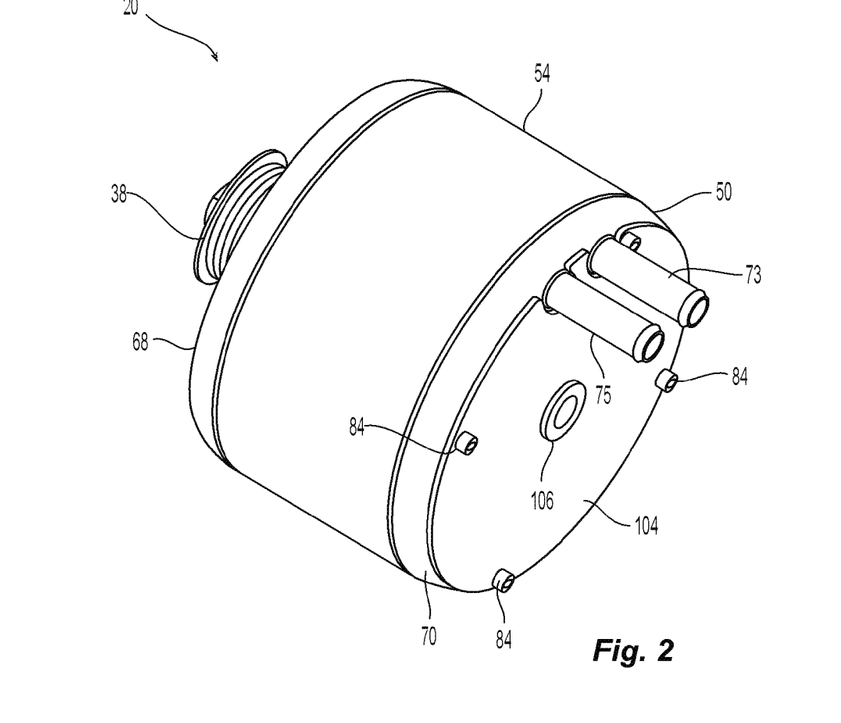
FIG. 2 is another perspective view of the electric machine.
Figure 3:
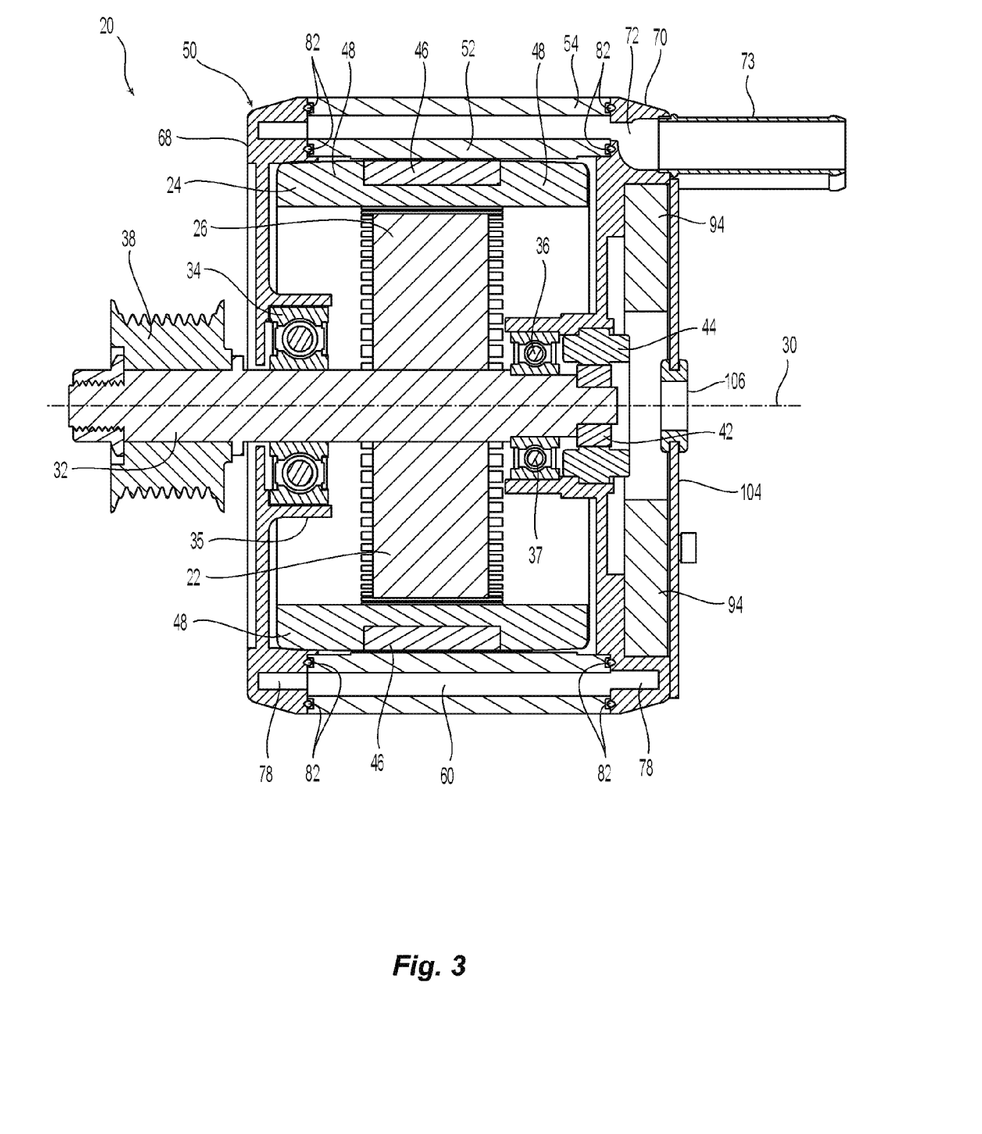
FIG. 3 is a cross sectional view of the electric machine.
Figure 4:
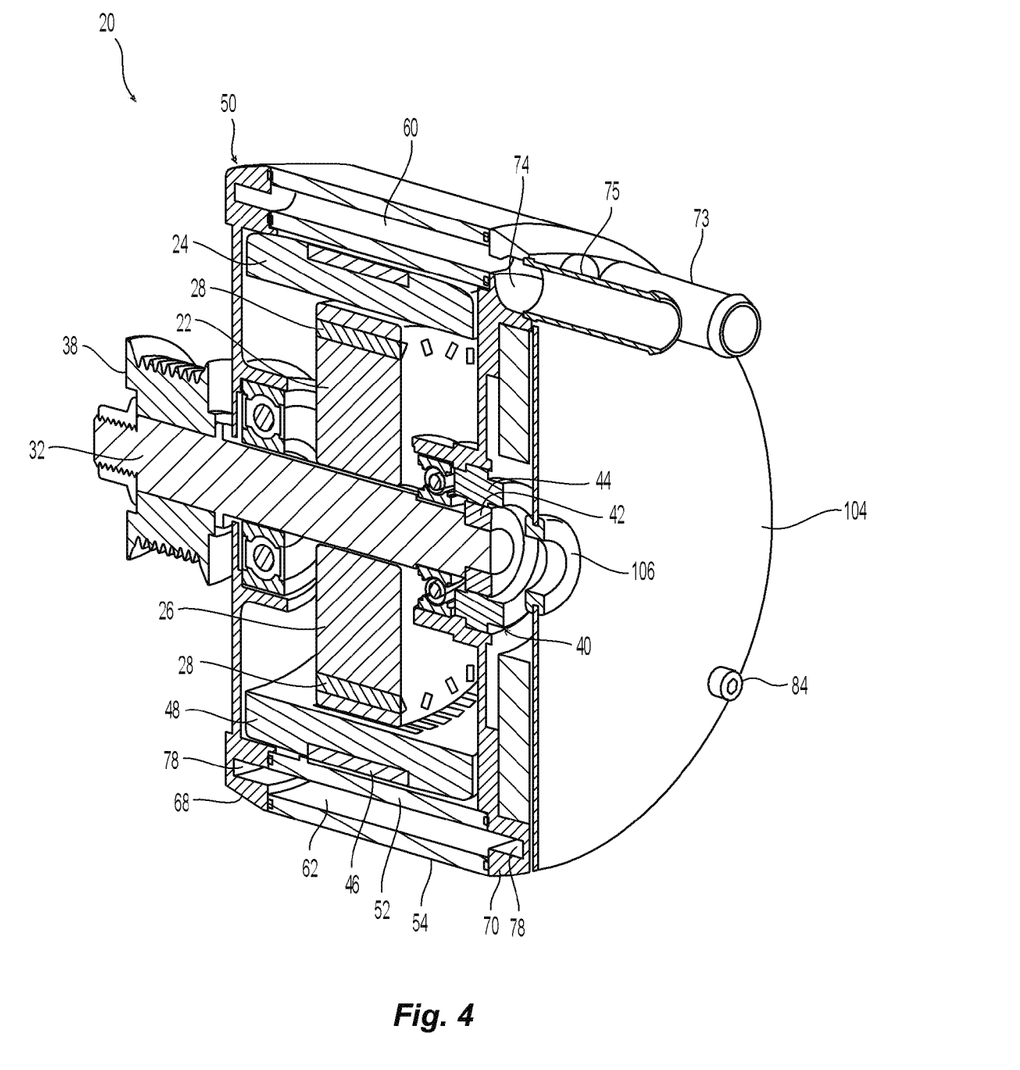
FIG. 4 is a perspective cross sectional view of the electric machine.
Figure 5:
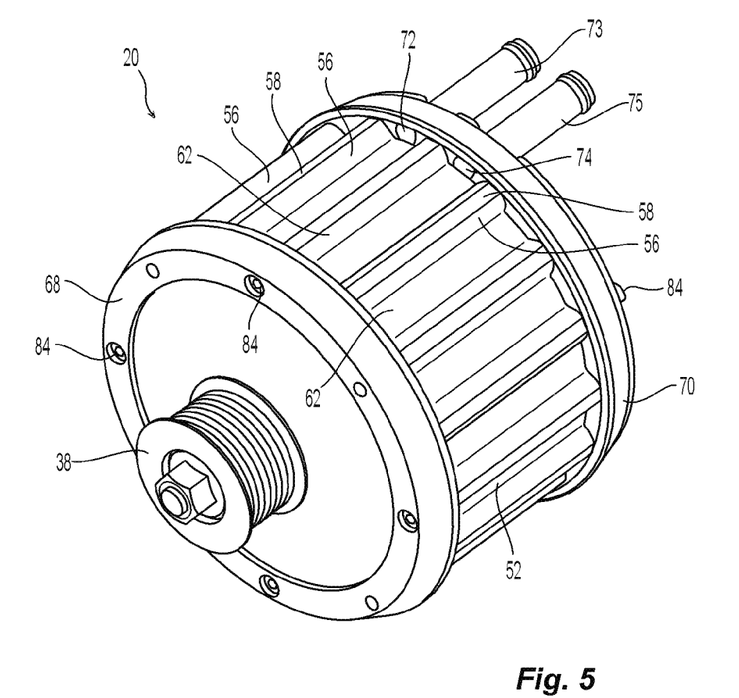
FIG. 5 is a perspective view of the electric machine with the outer housing member removed.
Figure 6:
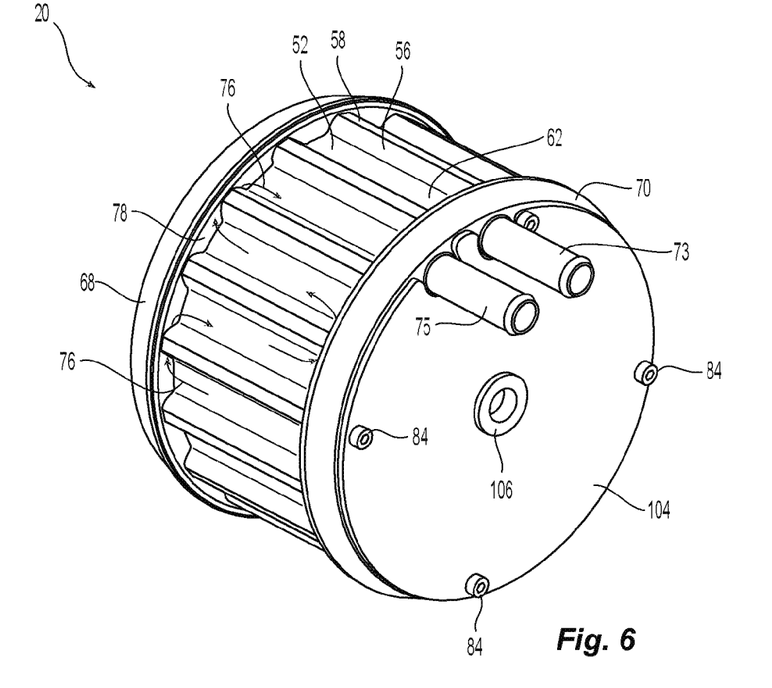
FIG. 6 is another perspective view of the electric machine with the outer housing member removed.
Figure 7:
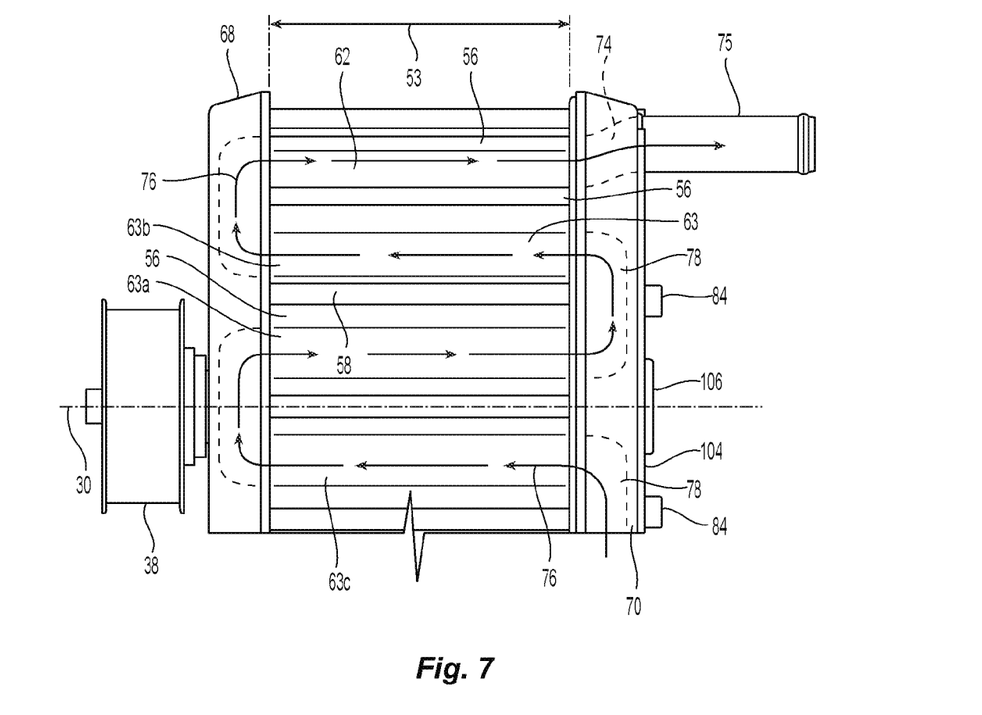
FIG. 7 is a partial side view of the electric machine with the outer housing member removed.

A sensor assembly 40 for monitoring the rotation of shaft 32 is located at the end of shaft 32 opposite pulley 38. Sensor assembly 40 includes a rotating member 42 and a stationary member 44 and may take the form of a resolver, Hall effect sensor or other suitable sensor. In the illustrated example, rotating member 42 is a ring with projecting ferrous metal teeth defining discrete targets for Hall effect sensor 44 whereby the rotational speed of shaft 32 can be monitored. The use of Hall effect sensors and similar sensors is well known to those having ordinary skill in the art.

Stator assembly 24 includes a stator core 46 that is also formed out of stacked electrical steel laminations. The illustrated stator assembly 24 has a stator core 46 which defines axially extending and radially inwardly opening slots. Wire coils which are also commonly referred to as windings 48 are inserted in the slots of stator core 46 and have end turns which project beyond the axial ends of stator core 46. In the illustrated embodiment, electric machine 20 is a three-phase electric machine.

Rotor assembly 22 and stator assembly 24 are manufactured using conventional techniques well-known to those having ordinary skill in the art. For example, rotor core 26 and stator core 46 are each formed out of a plurality of electrical steel laminations that are stamped in a progressive die assembly. The laminations forming rotor core 26 and stator core 46 can be secured together by welding, adhesives, inter-engaged tabs and slots in adjacent laminations, or by other suitable methods. For example, one adhesive method of securing laminations involves the use of a two part epoxy wherein one part is applied to the bottom surface of each of the laminations and the other is applied to the top surface of each of the laminations. Once stacked, the laminations are heated to adhere the two parts together and form a bonded core.

After forming stator core 46, windings 48 are inserted into stator core 46 using conventional coil insertion equipment. Similarly, after forming rotor core 26, magnets 28 are installed in the slots of rotor core 26.

Magnets 28 may either be magnetized prior to installation in rotor core 26 or may be non-magnetized when installed and have magnetic properties imparted to them after installation in rotor core 26. Magnets 26 may be advantageously formed out of neodymium iron boron. Dysprosium may be included when forming magnets 26 to provide greater temperature stability and allow the magnetic material to better resist the loss of magnetism. A variety of other materials may also be used to form magnets 28 including rare earth materials such as lithium, terbium and samarium. The use of these and other magnetic materials to form permanent magnets for use in electric machines is well-known to those having ordinary skill in the art. Magnets 28 may also include an outer layer of material such as a layer of nickel formed on the magnetic material by electroplating or a layer of aluminum formed by vapor diffusion that forms an outer coating on the magnet. Such outer coatings can be used to enhance resistance to corrosion.

Magnets 28 can be retained in the axial slots of core 26 by means of an adhesive, by a press-fit engagement with rotor core 26, or other suitable means. For example, rotor core 26 can be heated to thermally expand the size of rotor core 26 and the slots formed therein, providing sufficient clearance for magnets 28 to be inserted into the slots. Magnets 28 may also be chilled to reduce their dimensions. Rotor core 26 and magnets 28 are then allowed to return to ambient temperature with the rotor core 26 and magnets 28 being dimensioned such that magnets 28 are firmly engaged by rotor core 26 and secured therein when core 26 and magnets 28 are at the same temperature.

Figure 8:
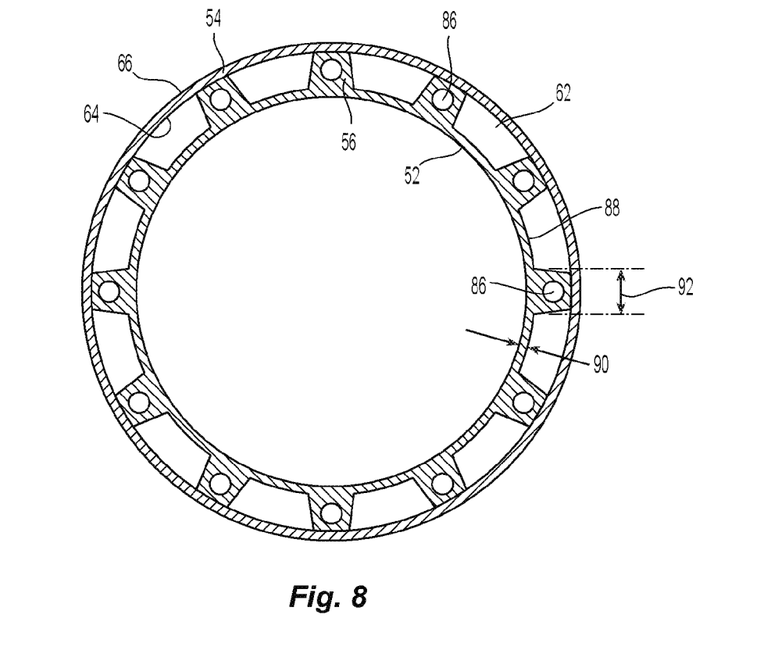
FIG. 8 is a cross sectional view of the inner and outer housing members.
Figure 9:
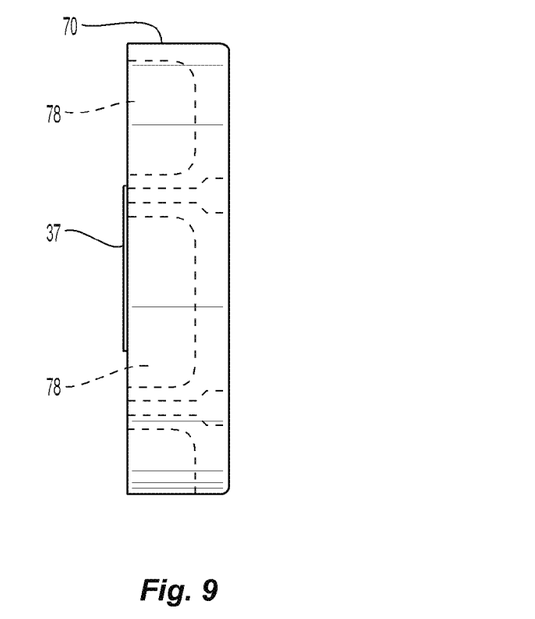
FIG. 9 is a side view of an end cap.
Figure 10:
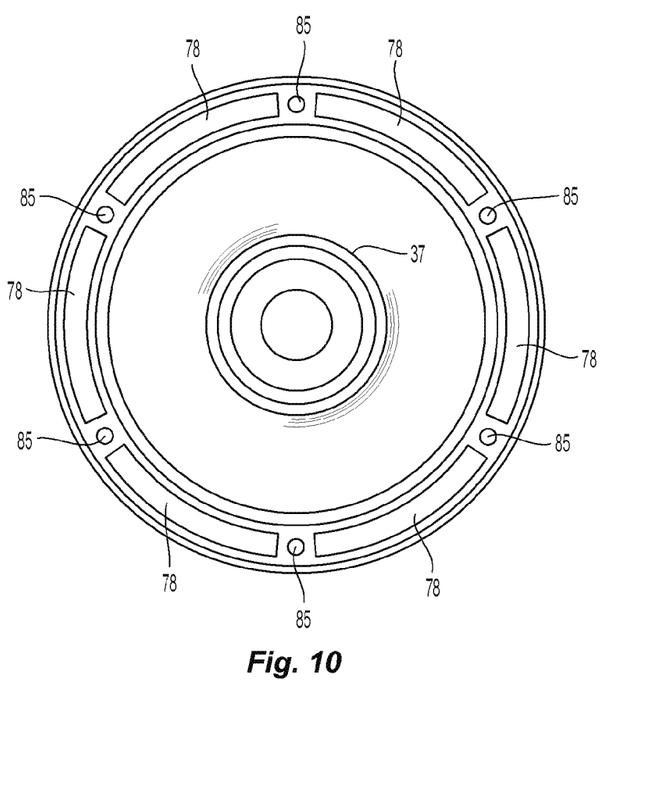
FIG. 10 is an end view of an end cap.
Figure 11:
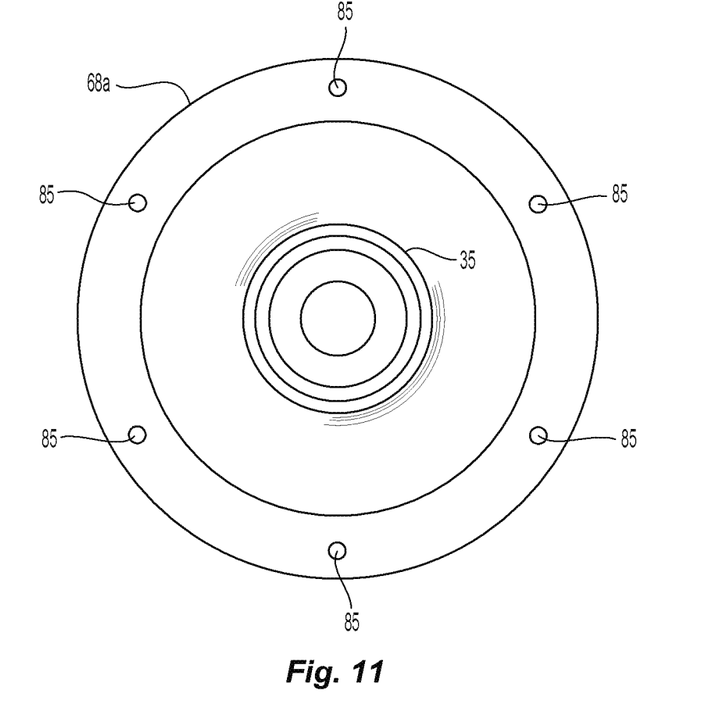
FIG. 11 is an end view of an alternative end cap.

Rotor 22 and stator 24 are mounted in a housing assembly 50. Housing assembly 50 includes an inner axially extending member 52 and an outer axially extending member 54 which encircle stator assembly 24. Inner housing member 52 encircles and directly engages stator core 46 and is thereby thermally coupled with stator core 46. In the illustrated embodiment, inner housing member 52 has a plurality of axially extending, radially outwardly projecting ribs 56. Outer housing member 54 encircles inner member 52 and is engaged with the distal ends 58 of ribs 54. An interstitial space 60 is defined between inner and outer housing members 52, 54 with ribs 56 subdividing space 60 into a plurality of axially extending fluid path segments 62. The flow of coolant through housing assembly 50 is discussed in greater detail below.

In the illustrated embodiment, outer housing member 54 takes the form of a tubular cylindrical sleeve with a substantially smooth walled radially inward surface 64 and a substantially smooth walled radially outward surface 66. The simplified cross section of outer housing member 54 facilitates the cost efficient manufacture of housing assembly 50 and, in some applications, may allow for the use of standard sized commercially available tube stock in the manufacture of one of the inner and outer axially extending housing members. It is noted that while the illustrated embodiment employs ribs 56 which extend radially outwardly from inner housing member 52, alternative embodiments could employ ribs 56 which are positioned on outer housing member 54 and extend radially inwardly to engage an inner housing member 52 with a simplified cross section, for example, a tubular sleeve with substantially smooth walled radially inward and outward facing surfaces.

Although the illustrated embodiment employs a cylindrical sleeve having inner and outer smooth walled surfaces as one of the housing members, alternative tubular sleeves may also be employed. For example, outer housing member 54 could be provided with heat radiating fins on its outwardly facing surface to promote the dissipation of heat to the ambient environment or could have mounting ears extending outwardly therefrom to provide for the securement of electric machine 20 with bolts or other fasteners or have other features formed on the outer surface of housing member 54. It is also noted that while inward facing surface 64 of housing member 54 is a smooth walled cylindrical surface in the illustrated embodiment, the symmetry of which promotes manufacturing and assembly efficiencies, other shapes and configurations can also be employed provided that the shape and configuration of the opposing housing member 52 and/or ribs 56 are modified as needed to provide for the cooperating engagement of housing members 52, 54.

End caps 68, 70 are located at the opposite ends of housing members 52, 54 and sealingly close the opposite axial ends of the interstitial space. In the illustrated embodiment, end cap 70 defines an inlet 72 and an outlet 74 wherein a coolant, e.g., water or a water-based anti-freeze coolant, enters through inlet 72 and then flows along a fluid path 76 that includes the plurality of axially extending fluid passages 62 which form axially extending fluid path segments of the larger fluid path 76. The flow is reversed at the axial end of each fluid path segment 62 and enters the circumferentially adjacent segment flowing in the opposite direction whereby the fluid path 76 defines a serpentine path for the liquid coolant before being discharged through outlet 74. Conduits 73, 75 are in communication with inlet 72 and outlet 74 respectively and extend outwardly to facilitate the connection of inlet 72 and outlet 74 to external coolant lines.

In the embodiment illustrated in FIGS. 1-7, inner and outer housing members 52, 54 have substantially the same axial length 53 and each of the plurality of ribs 56 has an axial extent 55 that is substantially the same as the axial length 53 of inner and outer housing members 52, 54. In this configuration with full length ribs 56, the reversal of the fluid flow occurs within fluid passageways 78 defined by end caps 68, 70 wherein each fluid passageway 78 conveys fluid from one axially extending fluid path segment 62 to a circumferentially adjacent segment 62. These end turn fluid passages 78 thereby interconnect adjacent ones of the axially extending fluid passages 62.

Figure 12:
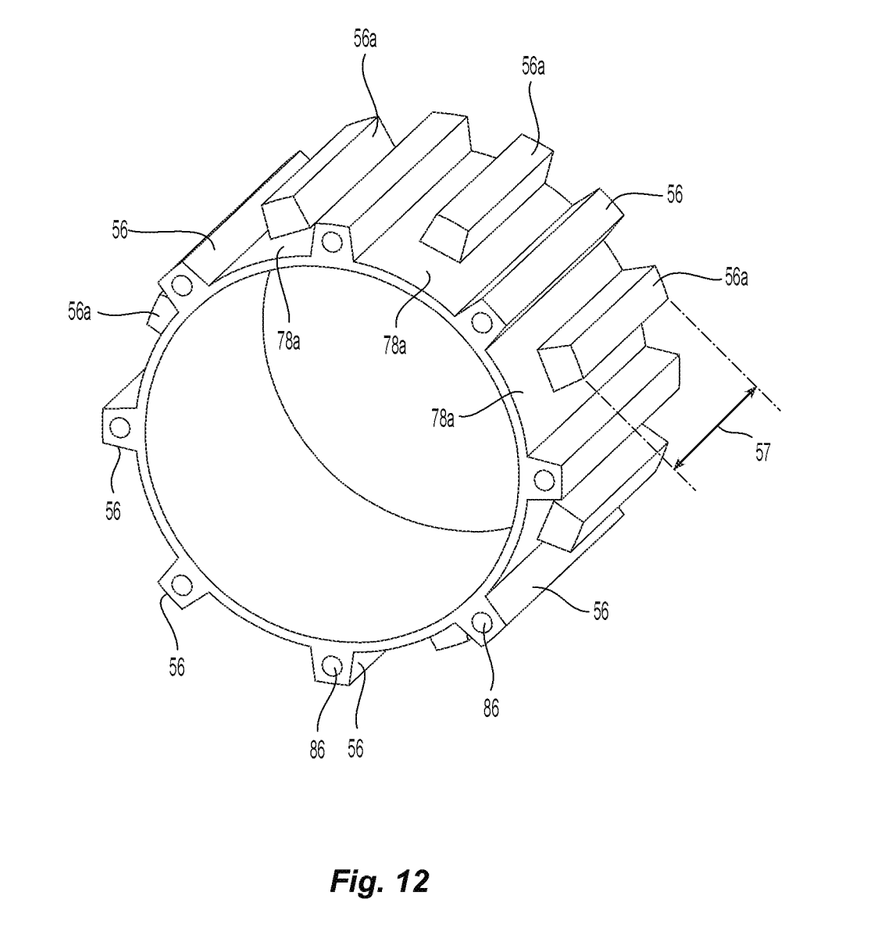
FIG. 12 is a perspective view of an alternative inner housing member.

Alternatively, at least some of the ribs 56a have an end portioned removed by machining and thereby define an axial extent 57 which is less than the axial length 53 of the inner and outer housing members 52, 54. In this manner, the shortened ribs 56a define a passageway 78a that communicates coolant between adjacent fluid path segments 62 as can be understood with reference to FIG. 12. When employing ribs 56a which allow for the reversal of the coolant flow within the axial limits of inner and outer housing members 52, 54, the end cap 68a positioned proximate to passageways 78a may have a substantially planar surface that engages the axial ends of inner and outer housing members 52, 54 thereby reducing the machining necessary to manufacture end cap 68a.

In embodiments having full length ribs 56 as well as those embodiments having shortened ribs 56a, fluid path 76 defines a serpentine path for the liquid coolant wherein the coolant flows in opposite axial directions in circumferentially adjacent ones of the fluid path segments 62 with the axial direction of the fluid flow being reversed between the adjacent segments 62 at positions proximate end caps 68, 70. In other words, the fluid path segments 62 define a plurality of paired passages 63 wherein for each set of paired passages 63, the end cap 68 or 70 redirects fluid flow from one 63a of the paired passages to the other 63b paired passage. In this regard, it will be noted that at one axial end, a particular passage (e.g., 63a) will be paired with the adjacent passage (e.g., 63b) on one circumferential side of the particular passage and, at the other axial end, will be paired with the adjacent passage (e.g., 63c) on the other circumferential side of the particular passage to thereby define a serpentine path.

It is further noted that, while the illustrated embodiment employs a flow path wherein the flow direction changes direction at each individual passage, alternative embodiments could employ a flow path wherein two, or more, adjacent flow passages are treated as a single passage and have fluid flow in the same direction. This fluid flow would then be reversed and communicated to a similar grouping of adjacent flow passages which provide for fluid flow in the opposite direction.

Cutouts at the ends of ribs 56a can be located on both axial ends of the plurality of ribs or on only one axial end. For example, if all of the ribs have cutouts defining a passageway 78a, one rib will have a cutout at one end and the two ribs on either side of it will have a cutout on the opposite end such that the cutouts alternate from one axial end to the other and thereby define a serpentine passageway. If cutouts are located at only one axial end, every other rib will be full length. For example, it may be advantageous for one end cap to define both passageways 78 and the inlet 72 and outlet 74 while the opposite end cap has a planar surface 80. In such an embodiment, the ribs would extend to the axial limit of housing members 52, 54 at the end where the end cap defining passageways 78, inlet 72 and outlet 74 while the end cap with planar surface 80 would be located at the opposite axial end of housing members 52, 54 at which passageways 78a defined by cutouts in ribs 56a were located.

Figure 13:
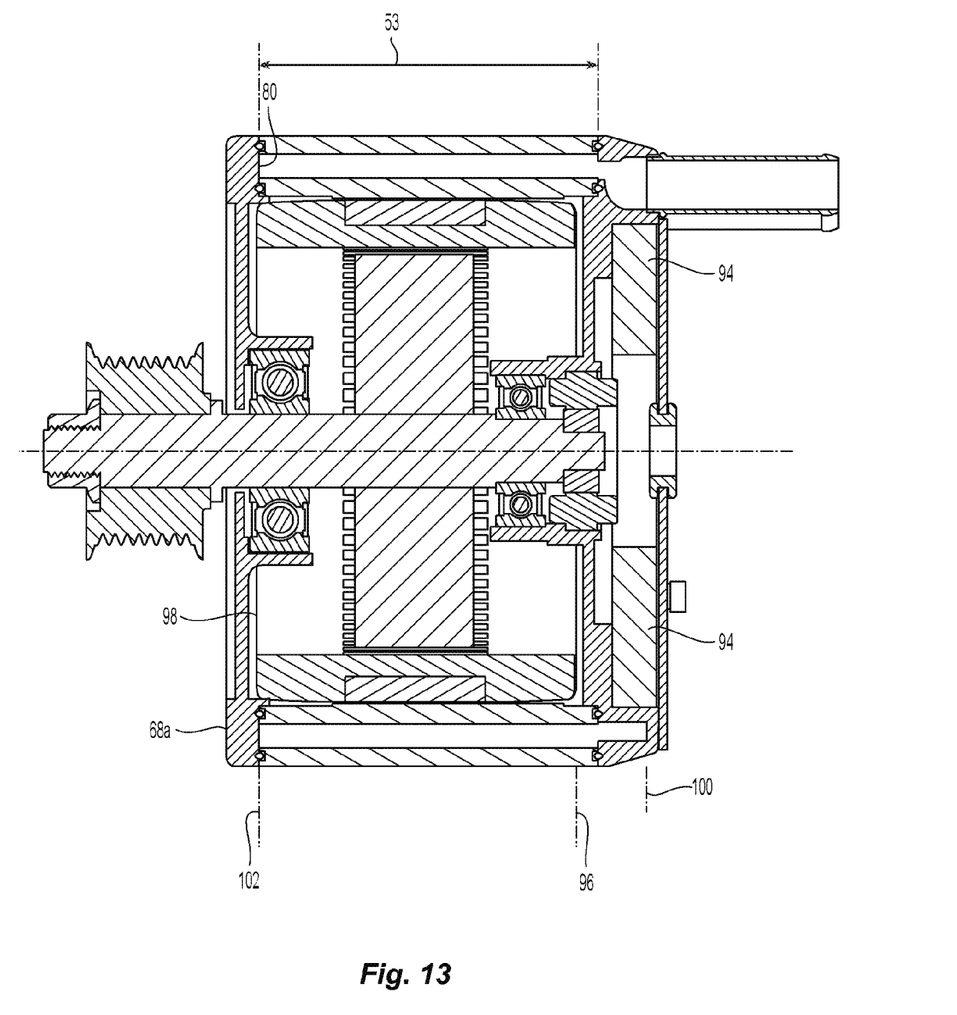
FIG. 13 is a cross sectional view of an alternative electric machine.

Passageways 78 in end caps 68, 70 define a significant surface area of end caps 68, 70 that is in direct contact with the coolant flowing through housing assembly 50 and thereby provide for the transmission of thermal energy from end caps 68, 70 to the coolant in a manner similar to how inner housing member 52 transmits thermal energy from stator assembly 24 to the coolant. This allows end caps 68, 70 to assist in the cooling of stator assembly 24 and/or cool other parts of electric machine 20 as discussed in greater detail below. While end cap 68a with its substantially planar surface 80 does not provide as large a surface area as passageways 78, it is impinged upon by fluid flow within passageway 78a and this direct contact with the coolant thermally couples the mass of end cap 68a with the coolant flowing through housing assembly 50 in a manner similar to passageways 78. It will generally be advantageous to orient planar surface 80 at a perpendicular angle to axis 30 as depicted in FIG. 13 to simplify the manufacture of housing assembly 50, however, the orientation of surface 80 could be altered if a particular application of electric machine 20 would benefit from such an alteration. Another modification that could be employed with passageways 78 in end caps 68, 70 is the use of protrusions or other irregularities in the surface of passageways 78 to provide an increased surface area for heat transfer or to generate turbulence in the fluid flow.

The coolant which passes through housing assembly 50 is circulated through a coolant system (not shown) that includes a device for removing heat from the coolant, e.g., a radiator or similar heat exchanging device, and advantageously includes a pump or similar device for circulating the coolant through housing 50. Thus, the heat transmitted to the coolant during its passage through housing assembly 50 is removed after coolant is discharged from housing assembly through outlet 74 and before it returns to housing assembly 50 through inlet 72. It is also noted that housing assembly 50 may be part of a larger and more complex cooling system which circulates coolant through multiple devices which require the removal of heat. The use of such coolant systems such as the coolant systems found in vehicles with internal combustion engines is well known to those having ordinary skill in the art.

The inner and outer housing members 52, 54 can be made out of a variety of materials. Inner housing member 52 will need to be formed out of a material capable of transmitting heat from stator assembly 24 to the coolant and it will generally be advantageous to form outer housing member 54 out of the same or similar material whereby both housing members 52, 54 will have the same coefficient of thermal expansion. In the illustrated embodiment, inner and outer housing members 52, 54 are both formed out of an aluminum material. The use of aluminum to form housing members 52, 54 is advantageous when it is desirable to minimize the weight of electric machine 20 such as when electric machine 20 will be used in a vehicle. Other metal materials, however, may also be used to form housing members 52, 54 and may be advantageous when minimizing the weight of electric machine 20 is not desirable.

In the illustrated embodiment, the configuration of inner and outer housing members 52, 54 facilitates their cost-efficient manufacture. More specifically, each of the housing members 52, 54 has a cross section, taken perpendicular to axis 30, that is substantially uniform along the entire axial length 53 of housing members 52, 54 whereby both of the housing members 52, 54 can be manufactured using an extrusion process. After cutting housing members 52, 54 to length, some machining may be necessary, but such machining, if required, will be relatively minor. For example, threaded bore holes and circular grooves may be formed in the axial end surfaces of housing members 52, 54 to provide for the attachment of the end caps 66, 68 and seating of O-rings or other sealing members to seal the joint between the housing members 52, 54 and end caps 66, 68. In embodiments employing shortened ribs 56a, the end of ribs 56a will also need to be removed by machining or other appropriate means to form passageways 78a. A small amount of additional machining may also be desirable, such as forming attachment locations for securing the housing assembly 50 to a vehicle frame or for registering the inner housing member 52 with stator assembly 24 or forming other secondary features in housing assembly 50. It would also be possible to machine outer housing member 54 to form inlet 72 and outlet 74 instead of forming these features on one of the end caps.

In the illustrated embodiment, end caps 68, 70 are be formed by casting an aluminum material, however, other suitable means and materials may also be used to form end caps 68, 70. As mentioned above, O-rings or other sealing members 82 may be used to provide a seal between end caps 68, 70 and housing members 52, 54 with two O-rings 82 on each axial end. Such that each end, one O-ring is positioned radially inwardly of interstitial space 60 between inner housing member 52 and the end cap and one O-ring is positioned radially outwardly of space 60 between outer housing member 54 and the end cap. In other words, O-rings 82 are disposed at each axial end of each of the inner and outer housing members 52, 54 and disposed between inner and outer housing members 52, 54 and end caps 52, 54. While the illustrated embodiment employs O-rings to provide a seal, other types of sealing members, such as gaskets and liquid sealants, may alternatively be employed as the sealing members 82.

End caps 68, 70 can be attached using threaded fasteners 84 or other suitable means. In the illustrated embodiment, end caps 68, 70 have axially extending bores 85 through which fasteners 84 are inserted. Threaded bore holes 86 located in one or both of the axially extending housing members 52, 54 are engaged by fasteners 84 to thereby secure end caps 68, 70 to housing members 52, 54. By using relatively wide ribs 56, the threaded bore holes 86 can advantageously be placed in ribs 56. In the illustrated embodiment, housing member 52 has a tubular portion 88 defining a radial thickness 90 while ribs 56 define a circumferentially extending width 92 that is greater than radial thickness 90. In the illustrated embodiment, every rib 56 has one threaded bore hole 86 at one end only with adjacent ribs 56 having bore holes 86 at opposing ends whereby end cap 68 is attached every other rib 56 while end cap 70 is also attached to every other rib 56 with each rib 56 being attached to only one of the end caps with a threaded fastener. It would also be possible to employ both thin and thick ribs in a single embodiment wherein only the thick ribs having threaded bores for the attachment of the end caps.

The use of threaded bore holes 86 positioned in ribs 56 allows the threaded fasteners to be positioned proximate the radial midpoint of interstitial space 60. This allows the end caps to engage the inner and outer housing members 52, 54 with substantially equivalent and balanced axially directed forces which facilitates the sealing engagement of caps 68, 70 with housing members 52, 54 over the life of electric machine 20. It also allows the tubular portion of each of the housing members 52, 54 to be sized based upon structural and performance considerations which do not include the necessity of including a threaded bore hole in the tubular portions. For many applications, this may allow the tubular portion to have a smaller radial thickness than it would have to have if threaded bore holes 86 were positioned in the tubular portions of the axially extending housing members. It is further noted that this configuration of enlarged ribs defining threaded bore holes can also be employed in embodiments where the ribs extend inwardly from outer housing member 54 instead of outwardly from inner housing member 52.

It is additionally noted that instead of using blind threaded bores in ribs 56, the bores 86 may be unthreaded and extend the full axial length of ribs 56. In such an embodiment, long bolts could extend through an end cap on one end, through ribs 56, and through the opposite end cap for securement. In such an embodiment, the uniform compression of the sealing members would be facilitated and the number of fasteners would be reduced. Furthermore, in such an alternative embodiment, the bores in ribs 56 could be extruded rather than machining threaded bores in ribs 56. For both the long bolt embodiment with bores extending the full length of ribs 56 and embodiments employing blind threaded bores in ribs 56, fasteners would engage end caps 68, 70 and extend into bores located in ribs 56.

As mentioned above, shaft 32 and rotor assembly 22 rotate together about axis 30 and are rotatably supported by bearing assemblies 34, 36. Bearing assemblies 34, 36 are mounted in hubs 35, 37 formed on end caps 68, 70. As a result, end caps 68, 70 act as heat sinks for bearing assemblies 34, 36. Additionally, because end caps are thermally coupled with the coolant circulating through housing assembly 50, the coolant will remove excess heat from end caps 68, 70. End caps 68, 70 can thereby remove heat from bearing assemblies 34, 36. Although the removal of heat from bearing assemblies 34, 36 may be limited, in some applications it could allow for the use of an incrementally smaller bearing and thereby provide for the more cost-efficient manufacture of electric machine 20.

A more significant secondary function of end cap 70 is the cooling of electronic components 94. In the illustrated embodiment, electronic components 94 includes a printed circuit board with control circuitry for controlling the operation of electric machine 20 and an inverter for converting DC current from the vehicle battery to AC current to power electric machine 20. Alternative embodiments, however, might employ different electronic components or include additional electronic components. For example, electric machine 20 could also function as a generator and be provided with a rectifier for converting the AC current generated by the electric machine into DC current for recharging the battery.

Thermally coupling electronic components 94 with end cap 70, for example, by mounting components 94 on end cap 70, will allow end cap 70 to act as a heat sink for electronic components 94. Moreover, the thermal coupling of end cap 70 with the coolant circulating through housing assembly 50 will remove heat from end cap 70 and thereby actively cool electronic components 94. This arrangement with end cap 70 acting as a heat sink and actively cooling electronic components 94 can facilitate the maintenance of electronic components 94 in their allowable temperature range over a broad range of operating conditions for electric machine 20.

Electronic components 94 are advantageously positioned radially inwardly and axially proximate end turn passages 78 defined within end cap 70. It is noted that stator windings 48 extend axially beyond the stator core 46 and the outermost portion of the windings define distal limits 96, 98 of the windings at opposite axial ends of electric machine. Similarly, serpentine path 76 defines two opposite axial limits 100, 102 of the serpentine shaped fluid path. Extending the axial limits 100, 102 of serpentine path 76 beyond the distal limits 96, 98 of stator windings 48 generally will not provide any meaningful contribution to the cooling of stator assembly 24. As a result, it will generally be advantageous for the end cap positioned on the axial end without electronic components 94 to define an axial limit 102 to serpentine path 76 that is proximate the distal limit 98 of stator windings 48. Only if extending serpentine path 76 beyond distal limit 98 serves some purpose other than cooling stator assembly 24 will extension of the serpentine path beyond the distal limit of stator windings 48 be likely to provide benefits.

At the axial end of electric machine 20 where electronic components 94 are located, i.e., end cap 70 in the illustrated embodiment, configuring the end cap whereby axial limit 100 of serpentine path 76 is positioned axially beyond distal limit 96 of stator windings 48 can provide for the cooling of electronic components 94 or some feature of electric machine 20 other than stator assembly 24. Thus, the distance between a distal limit of the stator and an axial limit of the fluid path at one axial end of the electric machine, may be greater than the distance between a distal limit of the stator and an axial limit of the fluid path at the opposite axial end of the electric machine. In the illustrated embodiment, electronic components 94 are at least partially positioned axially between distal limit 96 of stator windings 48 and axial limit 100 of serpentine path 76 to facilitate the efficient transfer of heat from electronic components 94 to end cap 70.

It is also noted that extending serpentine path 76 beyond one or more the distal limits 96, 98 of stator windings 48 may also serve a purpose other than cooling a part of the electric machine 20. For example, such an axial extension of serpentine path 76 could be employed to remove heat from the coolant. In such an alternative embodiment, the end cap could include fins which dissipate heat from the coolant into the surrounding ambient environment to remove heat from the coolant. U.S. patent application Ser. No. 13/905,953, by Chamberlin, filed on the same day as the present application and entitled "ELECTRIC MACHINE WITH LIQUID COOLED HOUSING AND END CAP" discloses the use of end caps for cooling purposes and the disclosure of this application is expressly incorporated herein by reference.

In the illustrated embodiment, a cover plate 104 is positioned on the axial end of end cap 70 and provides protection for electronic components 94 and sensor assembly 40. Cover plate 104 is secured with fasters 84 used to attach end cap 70 to ribs 56. A central opening in cover plate 104 is lined with a grommet 106 and allows the entry of wiring (not shown). The wiring conveys electrical current to power electric machine 20 and also conveys wiring used to convey sensor data and control signals between sensor assembly 40, electronic components 94 and an external controller such as the electronic control unit ("ECU") of a vehicle.

While this invention has been described as having an exemplary design, the present invention may be further modified within the spirit and scope of this disclosure. This application is therefore intended to cover any variations, uses, or adaptations of the invention using its general principles.

What is claimed is:
1. An electric machine comprising:
a stator operably coupled with a rotor wherein the stator includes a stator core and a plurality of windings and the rotor is rotatable about a rotational axis, the stator having a length extending the distance between distal limits of the windings at opposite axial ends of the electric machine;
a housing assembly including first and second end caps and inner and outer axially extending housing members wherein:
the stator core is disposed within and thermally coupled with the inner axially extending housing member and the outer axially extending housing member is disposed about the inner axially extending housing member and defines an interstitial space radially therebetween;
a plurality of ribs extends radially from one of the inner and outer housing members into the interstitial space, each of the ribs having a distal end which engages the opposite one of the inner and outer housing members, the opposite one of the inner and outer housing members being a tubular sleeve with a substantially smooth walled surface facing the interstitial space; the distal end of each of the plurality of ribs being engaged with the smooth walled surface; the plurality of ribs defining a plurality of axially extending fluid path segments within the interstitial space, the first and second end caps defining end turn passages through which fluid path segments are connected at opposite axial ends of the electric machine; and
electronic components located radially inward of the end turn passages;

wherein the first and second end caps sealingly close the opposite axial ends of the interstitial space and the housing assembly defines an inlet and an outlet wherein a liquid coolant enters the inlet, flows along a fluid path including the plurality of axially extending fluid path segments and the end turn passages and is discharged through the outlet; and wherein the fluid path has a length extending the distance between two opposite axial limits of the fluid path end turn passages and the fluid path length is greater than the stator length, whereby liquid coolant flow along the fluid path helps to cool the electronic components.

2. The electric machine of claim 1 wherein the plurality of ribs extends radially outwardly from the inner housing member and the substantially smooth walled surface is a radially inward facing cylindrical surface.

3. The electric machine of claim 1 wherein the inner and outer housing members and first and second end caps define a serpentine path for the liquid coolant wherein the liquid coolant flows in opposite axial directions in circumferentially adjacent ones of the fluid path segments with the axial direction of the fluid flow being reversed between the adjacent segments at positions proximate the first and second end caps.

4. The electric machine of claim 3 wherein the inner and outer housing members have substantially the same axial length and wherein each of the plurality of ribs has an axial extent that is substantially equivalent to the axial length of the inner and outer housing members.

5. The electric machine of claim 4 wherein each of the first end and second end caps defines a plurality of fluid passageways communicating fluid between the adjacent segments.

6. The electric machine of claim 3 wherein the inner and outer housing members have substantially the same axial length and at least some of the plurality of ribs are shortened and have an axial extent that is less than the axial length of the inner and outer housing members, the shortened ribs defining a passageway which communicates fluid between the adjacent segments.

7. The electric machine of claim 6 wherein at least one of the first and second end caps defines a substantially planar surface engageable with the inner and outer housing members proximate the passageways defined by the shortened ribs.

8. The electric machine of claim 1 wherein the inner and outer housing members each have an axial length and define a cross section that is substantially uniform along the entire axial length of the respective housing member whereby the inner and outer housing members are each extrudable.

9. The electric machine of claim 8 wherein the opposite one of the inner and outer housing members is a substantially cylindrical sleeve.

10. The electric machine of claim 8 further comprising four sealing members wherein one of the sealing members is disposed at each axial end of each of the inner and outer housing members and each of the sealing members is sealingly engaged with and disposed between one of the first and second end caps and one of the inner and outer housing members.

11. The electric machine of claim 1 wherein the one of the inner and outer housing members having the plurality of ribs extending therefrom includes a tubular portion having a radial thickness and wherein at least some of the plurality of ribs define a circumferentially extending width greater than the radial thickness of the tubular portion.

12. The electric machine of claim 11 wherein the first and second end caps are secured with threaded fasteners extending into bores located in the ribs having circumferential widths greater than the radial thickness of the tubular portion.

13. The electric machine of claim 1 wherein the distance between a distal limit of the stator and an axial limit of the fluid path at one axial end of the electric machine, is greater than the distance between a distal limit of the stator and an axial limit of the fluid path at the opposite axial end of the electric machine.

14. An electric machine comprising:
a stator operably coupled with a rotor wherein the stator includes a stator core and a plurality of windings and the rotor is rotatable about a rotational axis, the stator having a length extending the distance between distal limits of the windings at opposite axial ends of the electric machine;
a housing assembly including first and second end caps and inner and outer axially extending housing members wherein:
the stator core is disposed within and thermally coupled with the inner axially extending housing member and the outer axially extending housing member is disposed about the inner axially extending housing member and defines an interstitial space radially therebetween,
a plurality of ribs extends radially from one of the inner and outer housing members into the interstitial space, each of the ribs having a distal end which engages the opposite one of the inner and outer housing members,
the opposite one of the inner and outer housing members has a substantially smooth walled surface facing the interstitial space wherein the distal end of each of the plurality of ribs is engaged with the smooth walled surface,
the plurality of ribs defines a plurality of axially extending fluid path segments within the interstitial space, the first and second end caps defining end turn passages through which fluid path segments are connected at opposite axial ends of the electric machine, and
the inner and outer housing members each define an axial length and a cross section that is substantially uniform along the entire axial length of the respective housing member whereby the inner and outer housing members are each extrudable;
the one housing member including a tubular portion having a radial thickness wherein at least some of the plurality of ribs define a circumferentially extending width greater than the radial thickness of the tubular portion;
a plurality of fasteners engaging the first and second end caps and extending into bores located in the ribs having circumferential widths greater than the radial thickness of the tubular portion to thereby secure the first and second end caps to the one housing member wherein the first and second end caps sealingly close the opposite axial ends of the interstitial space and define an inlet and an outlet wherein a liquid coolant enters the inlet, flows along a serpentine fluid path defined by the inner and outer housing members and the first and second end caps with the liquid coolant and is discharged through the outlet; and
electronic components located radially inward of the end turn passages;
wherein the fluid path has a length extending the distance between two opposite axial limits of the fluid path end turn passages and the fluid path length is greater than the stator length, whereby liquid coolant flow along the fluid path helps to cool the electronic components.

15. The electric machine of claim 14 wherein the bores located in the ribs are threaded bores threadingly engaged with the plurality of fasteners.

16. The electric machine of claim 14 wherein the inner and outer housing members and first and second end caps define a serpentine path for the liquid coolant wherein the liquid coolant flows in opposite axial directions in circumferentially adjacent ones of the fluid path segments with the axial direction of the fluid flow being reversed between the adjacent segments at positions proximate the first and second end caps.

17. The electric machine of claim 16 wherein the inner and outer housing members have substantially the same axial length and wherein the plurality of ribs have an axial extent that is substantially equivalent to the axial length of the first and second housing members and wherein each of the first end and second end caps defines a plurality of fluid end turn passages communicating fluid between the adjacent fluid path segments.

18. The electric machine of claim 17 wherein the inner and outer housing members have substantially the same axial length and at least some of the plurality of ribs are shortened and have an axial extent that is less than the axial length of the inner and outer housing members, the shortened ribs defining end turn passages which communicate fluid between the adjacent segments and wherein at least one of the first and second end caps defines a substantially planar surface engageable with the inner and outer housing members proximate the end turn passages defined by the shortened ribs.

19. The electric machine of claim 14 wherein the rotor is mounted on a shaft and the rotor and shaft rotate together about the rotational axis; and the electric machine further comprises first and second bearing assemblies rotatably supporting the shaft on opposite axial ends of the rotor wherein the first bearing assembly is mounted on the first end cap and the second bearing assembly is mounted on the second end cap.

20. The electric machine of claim 14 wherein the plurality of ribs extends radially outwardly from the inner housing member and the outer housing member is a tubular cylindrical sleeve with substantially smooth walled radially inward facing and radially outward facing surfaces.

21. The electric machine of claim 14 further comprising four sealing members wherein one of the sealing members is disposed at each axial end of each of the first and second housing members and each of the sealing members is sealingly engaged with and disposed between one of the first and second end caps and one of the inner and outer housing members.

22. The electric machine of claim 14 wherein the distance between a distal limit of the stator and an axial limit of the fluid path at one axial end of the electric machine, is greater than the distance between a distal limit of the stator and an axial limit of the fluid path at the opposite axial end of the electric machine.

* * * * *